Aug. 10, 1943.    H. A. DUDGEON    2,326,339
SIZING DEVICE FOR MACHINING OPERATIONS
Filed March 31, 1941    5 Sheets-Sheet 1

Inventor
Harry A. Dudgeon
By Babcock & Babcock
Attorneys

Aug. 10, 1943.  H. A. DUDGEON  2,326,339
SIZING DEVICE FOR MACHINING OPERATIONS
Filed March 31, 1941   5 Sheets-Sheet 2
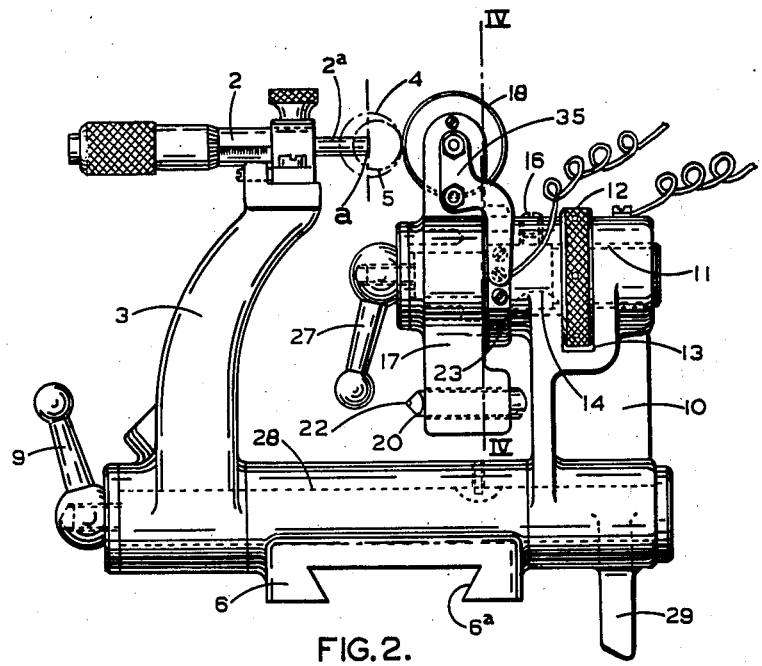
FIG. 2.
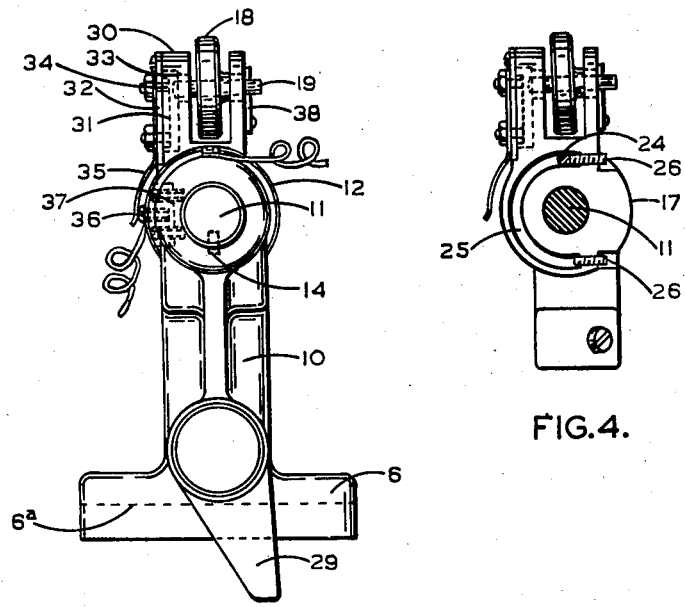
FIG. 3.
FIG. 4.
Inventor
Harry A. Dudgeon
By Babcock & Babcock
Attorneys Aug. 10, 1943.  H. A. DUDGEON  2,326,339
SIZING DEVICE FOR MACHINING OPERATIONS
Filed March 31, 1941   5 Sheets-Sheet 3
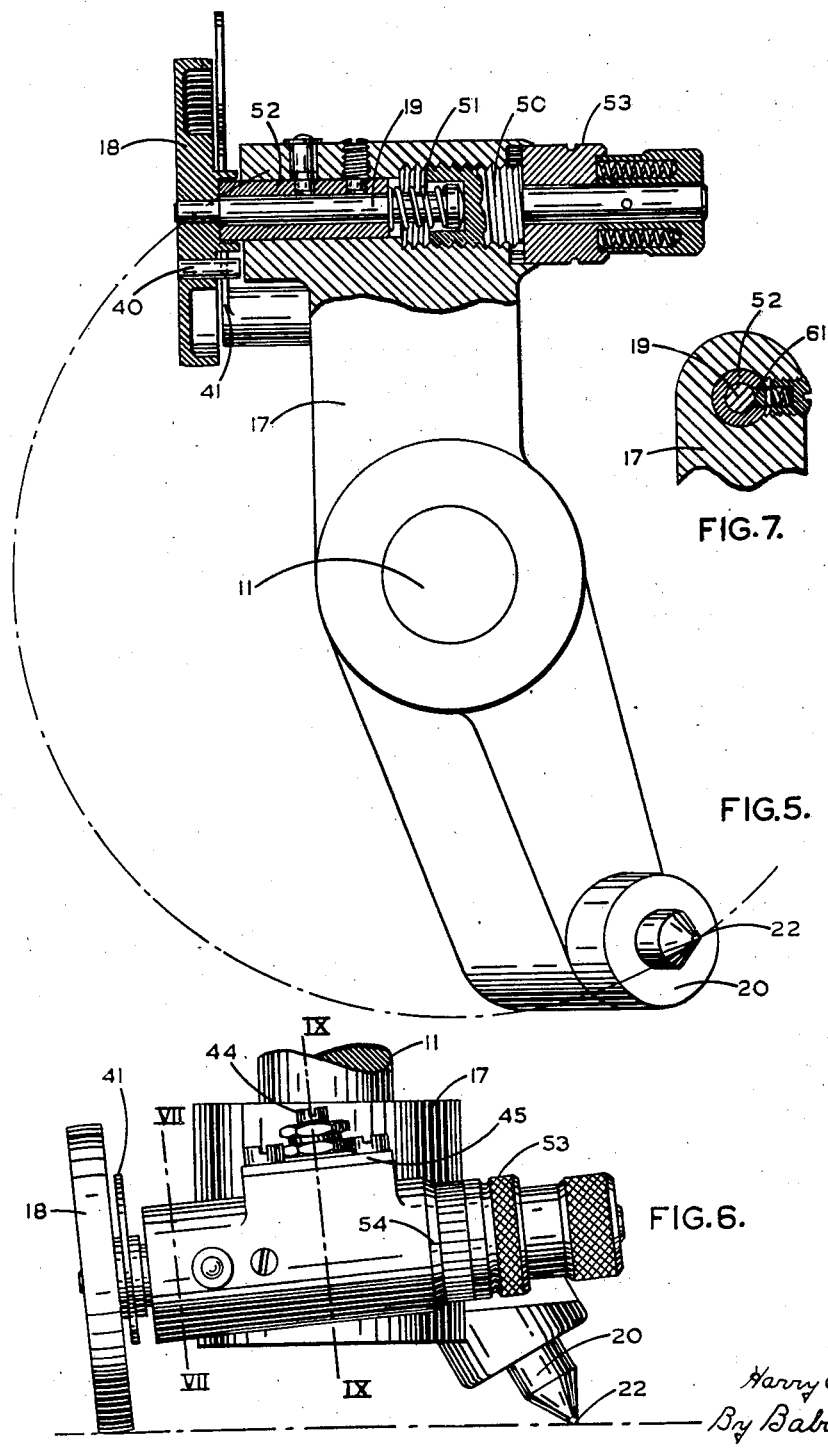

Aug. 10, 1943.          H. A. DUDGEON                    2,326,339
                  SIZING DEVICE FOR MACHINING OPERATIONS
                    Filed March 31, 1941          5 Sheets-Sheet 4
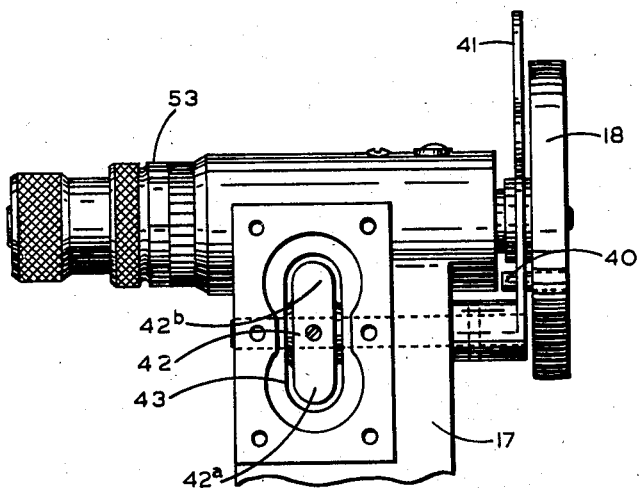
FIG. 8.
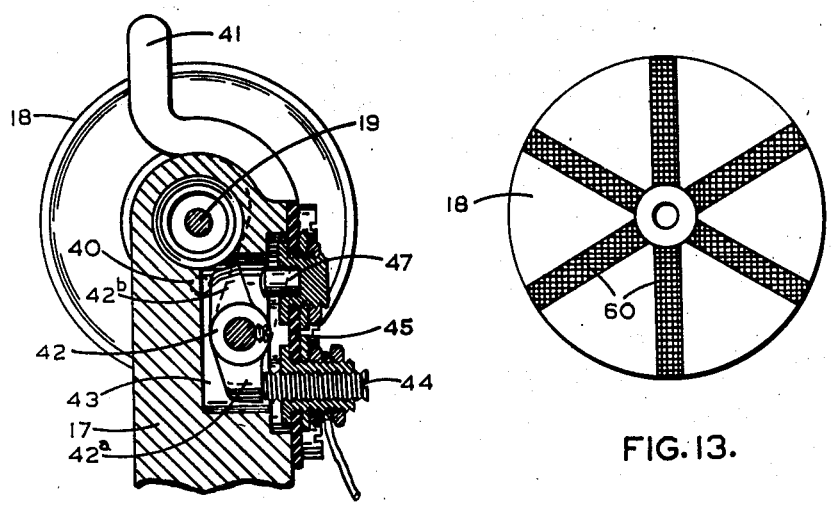
FIG. 9.                                    FIG. 13.
Inventor
Harry A. Dudgeon
By Babcock & Babcock
Attorneys Aug. 10, 1943.     H. A. DUDGEON     2,326,339
SIZING DEVICE FOR MACHINING OPERATIONS
Filed March 31, 1941     5 Sheets-Sheet 5

Inventor
Harry A. Dudgeon
By Babcock & Babcock
Attorneys

Patented Aug. 10, 1943

2,326,339

UNITED STATES PATENT OFFICE 2,326,339

SIZING DEVICE FOR MACHINING OPERATIONS

Harry Allsop Dudgeon, Kenilworth, England

Application March 31, 1941, Serial No. 386,167
In Great Britain April 18, 1940

10 Claims. (Cl. 51—165)

This invention relates to the control of machining operations when the work-piece has been machined to a pre-determined size thereby effecting considerable economies in time and material by the elimination of repeated gauging of the work-piece, and the reduction in the amount of scrapped work.

The primary object of the invention is to enable the operator to determine, in advance, the stage in a machining operation when it is desired that the functions of the machine shall be automatically or otherwise changed and/or another or others become operative. The functions referred to are such as stopping the machine, varying the speed of revolutions, or stopping the revolutions of the work or of the grinding wheel or other rotating tool, stopping or varying the rate or amount of the axial travel of the work or of the tool, stopping or varying the relative cross movement of the work or of the tool, lighting a warning light, or ringing a bell, or other functions appropriate to machines of the kind referred to.

A further object of the invention is to enable the operator of a grinding machine to determine, in advance of the grinding operation, the setting of a diamond trueing device in such a position that the grinding wheel, after being trued is in the correct or nearly correct, position for finish grinding the work to a predetermined size.

This invention involves the provision in association with a tool for performing a machining operation of a freely rotatable wheel (hereinafter referred to as the control wheel), and of means for setting the same so that the tool makes contact with and rotates said wheel at a predetermined stage in the machining operation. The position of the wheel in relation to the tool is determined, in advance of the machining operation, so that when the work has been machined to size, the control wheel is rotated and caused to make or break an electric circuit, or to make or break one circuit and to complete or break one or more other circuits, for the purpose of stopping or changing any one or more of the functions of the machine, or otherwise indicating that the operation is finished. In the case of grinding machines there may be associated with the means employed for setting the control wheel a diamond for trueing the grinding wheel, the arrangement being such that the diamond can be set so that, after the trueing operation, the periphery of the grinding wheel is correctly or nearly correctly located for finishing the work to the required size.

In one of its forms the action of a device, for the purposes referred to, embodying the present invention is based on the principle that if the peripheries of two rollers are brought into contact with each other with the axis of one of them at an angle to a plane containing the axis of the other and the point of contact between the two rollers, there is a tendency, if otherwise unrestrained, for the rollers to move axially and in opposite directions to each other when they revolve. In such cases the direction of the axial movement of each roller will depend upon the direction of their rotation and of the inclination of their axes to each other. The rate of axial travel will be determined by the speed of rotation of each roller and the degree of inclination of their axes to each other. If one of the rollers is restrained from axial movement the other roller, unrestrained, will move axially.

In the application of the aforesaid principle for the purposes of the present invention the control wheel is axially unrestrained and freely rotatable and adjusted so that, immediately contact is established between it and another movable or moving member which performs, or is associated with a member which performs, the machining operation, the control wheel is caused to move axially and to make or break an electric circuit controlling, directly or indirectly, the machining operation.

In another form of the device the rotational movement only of the control wheel is relied on to make or break an electric circuit controlling the operation of the machine, or some function thereof.

The application of the invention in either form is not confined to cases involving contact between the control wheel and another rotating member. It is equally applicable to cases where contact is made between the control wheel and a surface having a rectilinear motion.

In order that the invention may be clearly understood and readily carried into practical effect reference is made in the following description to the accompanying drawings in which the invention is shown as applied to a sizing device for use in connection with internal grinding operations.

Figure 2 is a side view of one form of the said device.

Figure 3 is a rear view of the device shown in Figure 2.

Figure 4 is a cross-sectional view on the line IV—IV of Figure 2.

Figure 5 is a part-sectional front view of an alternative form of the improved sizing device.

Figure 6 is a plan view thereof.

Figure 7 is a detail sectional view on the line VII—VII of Figure 6.

Figure 8 is a rear view of the device shown in Figure 6 with the di-electric cover plate removed.

Figure 9 is a cross-sectional view on the line IX—IX of Figure 6.

Figure 13 represents one way of marking the control wheel.

Figure 1:
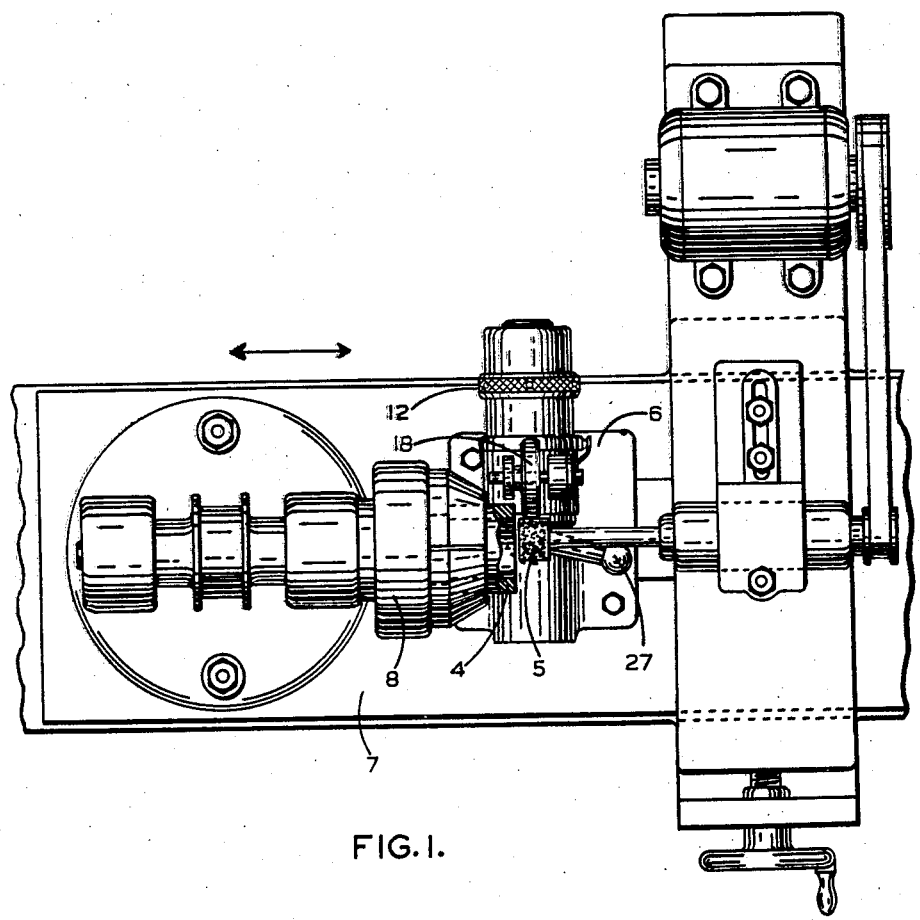
Figure 1 is a plan view of an internal grinding machine illustrating the application of the improved sizing device thereto.

According to one construction embodying the present invention and illustrated in Figures 2, 3 and 4, a measuring instrument, such as the micrometer head 2 is mounted in the upper end of an arm 3 and in front of the rotational axis $a$ of the work-piece 4. The axis of the micrometer is horizontal and at right angles to and at the same height as the axis of the grinding wheel 5. The said arm 3 is pivoted at its lower end in a base member 6, about an axis parallel with the axis of the micrometer. In the case of an internal grinding machine in which, as shown in Figure 1, the grinding wheel 5 operates on the rear surface of the hole in the work-piece 4, the said base member 6 is mounted upon a table 7 which carries the work-head 8 and is arranged for movement towards and away from the grinding wheel in the directions indicated by the double-headed arrow in Figure 1. The arrangement is such that by slackening the hand nut 9 the arm 3 carrying the micrometer head can be swung of the way during the grinding operation. The base member 6 is adjustable upon the table in the direction of the aforesaid arrow so that it can be set nearer to or further away from the free end of the work-piece as required. For this purpose the underside of the base member is formed with a groove 6ª of dovetail section adapted to engage a correspondingly shaped guide on the table 7.

The micrometer is adjusted axially in the arm 3 and is set so that when the micrometer reading is at zero, the free end of its spindle 2ª is exactly at the axis $a$ of the work-piece. The graduations on the micrometer are arranged to read in a direction opposite to the usual and are such as to indicate twice the movement of the spindle 2ª, i. e. an actual axial movement of the spindle of, say, .125" would be indicated as .25". This is necessary because the graduations are required to indicate diameters, whereas the actual axial movement of the spindle represent radii.

Preferably mounted on the same pivot in the base member 6, which carries the micrometer arm 3, is a control wheel arm 10, this being on the opposite side of the axis $a$ of the work-piece and, therefore, remote from the micrometer. Carried by the upper end of the control wheel arm 10 is an axially adjustable screwed spindle 11, having its axis parallel with the pivot at the base of the arm. A nut 12 placed between the limbs of a fork 13 in the arm 10 is provided for the axial adjustment of the spindle 11, a key or feather 14 in the spindle, sliding in a keyway in the arm 10, preventing the spindle from rotating, and a screw 16, in the arm bearing on the spindle, is provided to retain the spindle in position after adjustment.

Rotatably mounted on the front end of the spindle 11 is a block 17, one end of which is forked to receive a control wheel 18. The control wheel is attached to a small spindle 19 mounted so as to be free to turn and to move axially in the limbs of the fork with its axis slightly inclined in front elevation to the axis of the grinding wheel while being parallel with it in plan view. The arrangement of the control wheel spindle is further such that the axis of the micrometer, in its operative position, passes through, or near to, the central plane of the control wheel normal to the axis thereof, and through the axis of the control wheel spindle 19.

The other end of the block 17 carries a screw-threaded diamond holder 20 which is axially adjustable in the block. The hole in the block for the diamond holder may be horizontal or inclined in any direction, but the point 22 of the diamond should be in, or near to, a vertical plane containing the front peripheral face of the control wheel 18. The block is pivotally mounted on the screwed spindle 11 about an axis midway between the point of the diamond and the axis of the control wheel, so that by rotating the block about its axis, as indicated in Figure 5, either the control wheel or the diamond can be brought uppermost into its operative position. These positions may be determined by the following means. The screwed spindle 11 may be provided with a flange 23 having a stop 24 fixed in one face near its periphery. This stop projects into a semi-annular recess 25, see Figure 4, formed in the rear face of the block 17 concentrically with the axis of the screwed spindle 11. The circumferential length of the recess is more than is required to permit either the control wheel or the diamond to be brought into its operative position. At each end of the recess a hole is tapped to receive an adjusting screw 26, against the inner end of either of which the stop 24 is adapted to bear. By suitable adjustment of these screws the control wheel and the diamond can be located in their desired operative positions. Any suitable means, such as the hand nut 27, may be employed for locking the block in either of its two positions.

The control wheel arm 10 may be swung about its pivot 28 in the base member 6 to facilitate the removal or insertion of the work-piece, or for any other purpose, and means are provided for locating the said arm in a definite upright position, such as by means of an extension 29 on the arm 10 adapted to bear against the surface of the machine table 7.

By virtue of the aforesaid inclination of the control wheel spindle, the control wheel and its spindle will move axially when revolved by contact with the periphery of the rotating grinding wheel 5. Such contact may be arranged to take place at any predetermined stage in the grinding operation, according to the setting of the control wheel. Usually, the control wheel will be set so as to be contacted by the grinding wheel when the work has been ground to the desired diameter. In the specific arrangement shown in Figures 2 and 3, the axial movement of the control wheel spindle is caused to complete an electric circuit controlling the operation of the machine, or of some part thereof, such as the feed mechanism for the grinding wheel, or the said circuit may be used to ring a bell or light a lamp. For this purpose one of the limbs 30 of the forked end of the block 17 is recessed at the outside to receive a contact plate 31 carried by a piece of insulating material 32, such as vulcanite, which is secured to the said limb over the recess 33. The contact plate carries a contact 34 against which the end of the control wheel spindle 19 is adapted to bear when moved axially. Attached to the contact plate is an outside blade spring 35 the free end of which normally makes contact with a contact stud 36 mounted in a block 37 of insulating material secured to the flange 23 on the screwed spindle 11. One of the leads of the electric circuit is attached, as shown in Figures 2 and 3, to the said contact stud and the other lead to the control wheel arm 10. Alternatively, the axial movement of the control wheel spindle may be employed to break an electric circuit controlling the operation of the machine or some particular function thereof, or to make or break one circuit and to break or make another electric circuit so as to change the operation of the machine from performing one function to performing another.

The axial movement of the control wheel and its spindle is limited by the limb 39 of the fork and means are provided to retain the control wheel in its inoperative axial position prior to making contact with the grinding wheel. For this purpose a wire spring 38 attached to the fork may be arranged to bear upon the periphery of the control wheel spindle 19, as shown in Figure 3.

In use the sizing device above described functions as follows: Assuming it is desired to grind a hole 1" in diameter, the micrometer head 2 and control wheel 18, when in their vertical positions, are adjusted so that they are as near to the free end of the work 4 as is practicable, and so that the control wheel during the traverse of the table 7 of the machine passes across the rear periphery of the grinding wheel. The micrometer is set to read 1", which projects the free end of its spindle ½" beyond the axis $a$ of the work-piece. The block 17 carrying the control wheel is now adjusted by means of the nut 12 on the screwed spindle 11 so that the near periphery of the control wheel just touches the free end of the micrometer spindle 2ª. The micrometer arm 3 can now be swung out of the way and the control wheel arm 10 locked in its vertical position by means of the hand nut 9. Grinding of the hole can now be commenced during which the automatic cross-feed of the grinding wheel is controlled by the electric circuit of which the control wheel spindle forms part. The said cross-feed continues until the grinding wheel 5 contacts with the control wheel, at which moment the grinding wheel is in position for taking a final cut. Immediately the grinding wheel touches the control wheel the latter is caused to revolve and to break the electric circuit controlling the operation of the cross-feed of the grinding wheel. Alternatively, the axial movement of the control wheel spindle may be employed to complete a circuit. In a similar manner electric circuits controlling various other functions hereinbefore referred to can be operated.

The point 22 of the diamond can be adjusted towards the micrometer either by rotating the diamond holder 20 in the block 17 or by adjusting the block on the screwed spindle 11 by means of the nut 12. The diamond can be used for dressing the grinding wheel with or without the control wheel, or vice versa. If used with the control wheel the point of the diamond should be adjusted so that, as aforesaid, it is slightly in front of a vertical plane containing the front peripheral face of the control wheel, so that after trueing the grinding wheel and rotating the block to bring the control wheel again into commission, the grinding wheel will still require a further cross-movement before actually touching the control wheel.

Instead of mounting the spindle of the control wheel with its axis inclined to the axis of the grinding wheel, it may be arranged parallel therewith in both elevation and plan. In this case there will, of course, be no axial movement of the control wheel and spindle when the control wheel makes contact with the grinding wheel but the control wheel will still be rotated. In this case the rotational movement of the control wheel may be utilised to make or break an electric circuit controlling the operation of the machine or warning signal.

For this purpose, as shown in Figures 5, 6, 7, 8 and 9 the control wheel 18, which in this case is attached to one end of its spindle 19 and overhangs the bearing in the block 17, is provided on its inside face with a projecting pin 40, adapted, when the control wheel is revolved, to make contact with a control lever 41 fixed to the spindle of a tumbler 42 occupying a recess 43 in the block. One end 42ª of the tumbler is normally in contact with a terminal screw 44 carried by a plate 45 of insulating material which closes the said recess. The other end 42ᵇ of the tumbler is adapted to make contact with a plug 47 of insulating material also carried by the said cover plate. The arrangement is such that, when the control wheel is rotated by contact with the grinding wheel, the pin 40 knocks over the tumbler 42, thereby breaking the electric circuit controlling the operation of the machine or some part thereof. The tumbler may be reset by means of the control lever 41, or the latter may be used to break the circuit independently of the control wheel, as and when required.

For the purposes of obtaining a very fine adjustment of the control wheel the spindle 19 thereof can, as shown in Figure 6, be arranged with its axis at an angle to the axis of the grinding wheel in plan view. The axial adjustment of the control wheel may be obtained by means of a micrometer screw 50 against the action of a compression spring 51 normally tending to keep the inner face of the control wheel 18 close up against the outer end of the bearing bush 52 in the block 17. The inner end of the micrometer screw, which engages a tapped hole in the block, is recessed and bears against the inner end of the control wheel spindle 19 so that, when rotated by turning the knurled and calibrated sleeve 53 relatively to an index mark 54 on the block 17 a very fine adjustment can be obtained. The peripheral face of the control wheel will in this case be formed as part of a sphere having its centre in the axis of the spindle at the mid-plane of the wheel.

Figure 10:
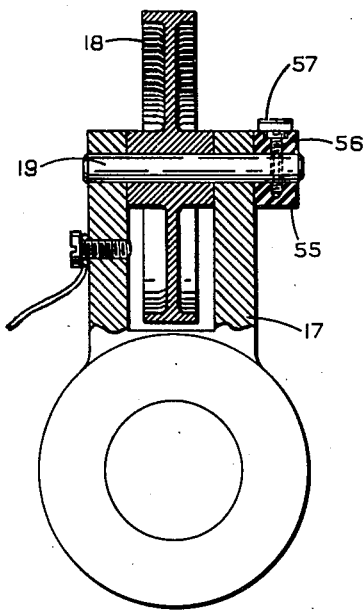
Figure 10 is a sectional front view illustrating a further modification.
Figure 11:
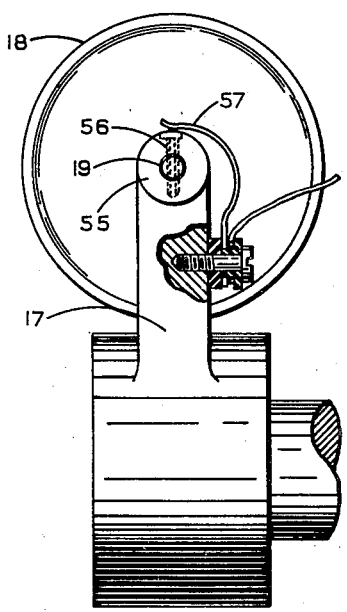
Figure 11 is a side view thereof.

In the modification shown in Figures 10 and 11, one end of the spindle 19 of the control wheel 18 is provided with a collar 55 of some di-electric material, such as vulcanite. Let into the circumferential surface of the collar is a metal stud 56 which is in metallic contact with the control wheel spindle. Pressing against the circumferential surface of the collar is the free end of a flat metal spring 57, the other end of which is secured to but insulated from the block 17. A wire which forms part of an electric circuit is attached to the spring and another wire forming part of the same circuit is attached to the said block. When the free end of the spring 57 rests on the vulcanite the electric circuit is incomplete, but when the control wheel is partially rotated so that the stud in the collar makes contact with the spring, the circuit is closed to control any or all of the functions of the machine. Any desired number of collars, studs and springs may be attached to the spindle 19.

Figure 12:
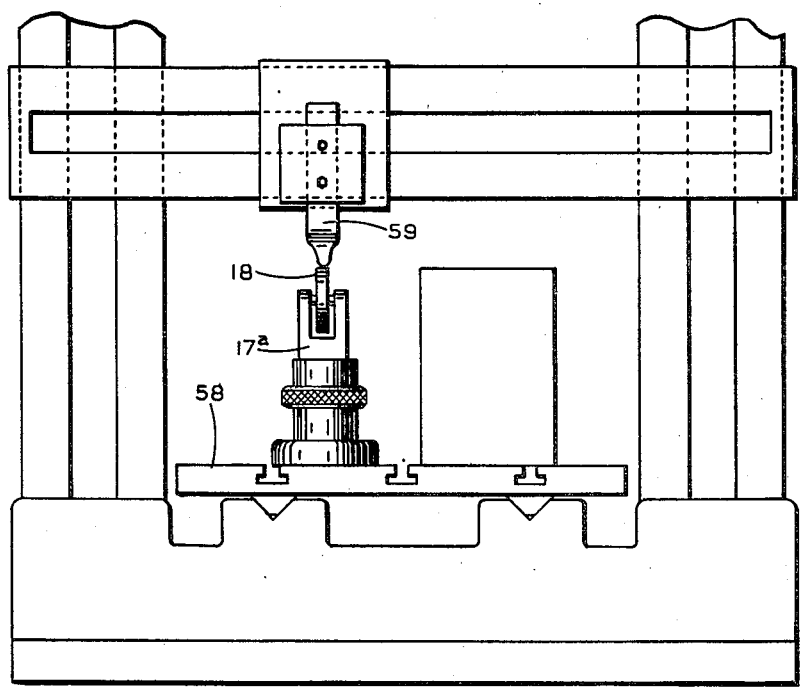
Figure 12 is a diagrammatic view illustrating one application of the improved sizing device to a planing machine.

The sizing devices herein described are not limited in their application to machining operations in which the relative movement between the tool and the work-piece is of a rotational nature; they may be used with equal advantage in cases where the said relative movement is of a rectilinear nature. For example, as represented diagrammatically in Figure 12, the said device may be used in connection with planing operations. In this case the control wheel 18 may be carried by a block 17a adapted for attachment to the reciprocating table 58 of the machine, said block and control wheel being adjusted so that, at a pre-determined stage in the planing operation, the control wheel makes contact with and is given a rotary movement by the tool 59 to break an electric circuit controlling the feed movement of the tool, or the operation of any other function of the machine, or of a visible or audible signal.

As an alternative to using the control wheel as an electric switch in any of the ways above described, the control wheel may be used to give an ocular demonstration that a pre-determined stage in the machining operation has been reached. For example, as indicated in Figure 13, the control wheel 18 may be painted in radial lines 60 of one or more colours, or otherwise marked, so that when revolved by contact with the operating tool, the fact that the control wheel is rotating can be readily seen and appropriate action taken by the operator to stop the cross-feed or other function of the machine.

In order to prevent looseness between the control wheel spindle 19 and its bearings in the forked end of the block 17, and to thereby maintain accuracy of the work, a spring-loaded pressure pad 61, as shown in Figure 7, may be arranged to bear against the said spindle in a direction away from the grinding wheel.

The control wheel may be made of any suitable material, such as steel, brass, aluminium, rubber, vulcanite, fibre or the like, and its periphery may be hardened where this is possible. Being free to rotate the control wheel is not subject to any appreciable wear so that the sizing device will continue to function for long periods of continuous use without replacements.

Sizing devices embodying this invention may be applied to other than internal grinding or planing machines, such as external cylindrical, or surface grinding machines, and in all cases where it is desired to automatically start, arrest, or to vary the machining operation when the workpiece has been machined to the required size.

I claim:

1. For the control of machining operations, the combination with a tool for performing said operations, of a freely rotatable wheel arranged so that the operative portion of the tool makes contact with and rotates said wheel at a pre-determined stage of the machining operation, and an electric switch arranged for direct operation by the rotation of said wheel and adapted to make and break an electric circuit controlling said machining operation.

2. For the control of machining operations, the combination with a tool for performing said operations, of a freely rotatable control wheel arranged to be rotated by the operative portion of said tool at a pre-determined stage in the machining operation, an electrically operated warning device, and a switch arranged for direct operation by the rotation of said wheel to complete an electric circuit controlling the effective operation of said warning device.

3. For the automatic control of machining operations, the combination with a tool for performing said operations and with means for actuating said tool, of a freely rotatable control wheel arranged and adapted to be contacted and rotated by the operative portion of said tool at a predetermined stage in the machining operation, and a switch arranged for direct operation by the rotation of said wheel to complete an electric circuit controlling the operation of said tool actuating means.

4. For the automatic control of internal grinding operations, the combination with a rotatable grinding wheel and with feed mechanism therefor, of a freely rotatable control wheel adapted to be contacted and rotated by the operative portion of said grinding wheel at a pre-determined stage in the grinding operation, and a switch arranged for direct operation by the rotation of said control wheel to break an electric circuit controlling the operation of said feed mechanism.

5. For the automatic control of internal grinding operations, the combination with a rotatable grinding wheel and with feed mechanism therefor, of a control wheel, means for adjusting said wheel to a position in which the periphery thereof is contacted by the said grinding wheel at a predetermined stage in the grinding operation, a freely rotatable and axially movable spindle fixed to said wheel and arranged with its axis parallel with the axis of the said grinding wheel in elevation but inclined thereto in plan view, and a switch arranged for direct operation by the axial movement of said spindle on rotation to complete an electric circuit controlling the operation of said machine.

6. For the automatic control of grinding operations, the combination with the grinding wheel of an internal grinding machine, of a freely rotatable control wheel adjustably mounted on said machine and adapted to be contacted and rotated by the operative portion of said grinding wheel at a predetermined stage in the grinding operation, means for determining the position of said control wheel with respect to said grinding wheel, and a switch arranged for direct operation by the rotation of said control wheel to complete an electric circuit for controlling the operation of said grinding machine.

7. For the automatic control of machining operations, the combination with a machine for performing a plurality of machining operations, of a freely rotatable wheel adjustably mounted on said machine and adapted to be rotated at a predetermined stage in each operation, and a switch arranged for direct operation by the rotation of said control wheel for breaking an electric circuit controlling one operation and completing another circuit controlling another operation.

8. For the automatic control of machining operations, the combination with a tool for performing said operations, of a freely rotatable control wheel adapted, at a predetermined stage in the machining operation, to make contact with and to be rotated by the operative portion of said tool, an electric circuit controlling the machining operation, and electric contacts forming part of said circuit one of which is actuated direct by the rotation of said wheel for making or breaking said circuit.

9. For the automatic control of grinding operations, the combination with a rotatable grinding wheel and work-piece having relative axial movement, of a freely rotatable control wheel arranged with its axis parallel with the axis of said grinding wheel and adapted at a predetermined stage in the grinding operation to make contact with and to be rotated by said grinding wheel, an electric circuit controlling the feed movement of said grinding wheel and a switch actuated direct by the rotation of said control wheel for breaking said circuit.

10. A device of the character and for the purposes described comprising a supporting structure adapted for adjustment on a grinding machine having a rotatable grinding wheel, a control wheel mounted for free rotation on said structure, and adapted at a predetermined stage in the grinding operation for rotation by direct contact with the abrading surface of said grinding wheel, means for determining the position of said control wheel relatively to said grinding wheel, and an electric switch arranged for direct operation by the rotation of said control wheel to break an electric circuit controlling the effective operation of said grinding machine.

HARRY ALLSOP DUDGEON.